US 8,765,282 B2

(12) United States Patent
Herrmann

(10) Patent No.: US 8,765,282 B2
(45) Date of Patent: Jul. 1, 2014

(54) BATTERY ASSEMBLIES

(75) Inventor: Manfred Herrmann, Ginsheim-Gustavsburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 595 days.

(21) Appl. No.: 12/642,200

(22) Filed: Dec. 18, 2009

(65) Prior Publication Data

US 2011/0151300 A1    Jun. 23, 2011

(51) Int. Cl.
*H01M 10/50* (2006.01)
*H01M 6/50* (2006.01)

(52) U.S. Cl.
CPC ........ *H01M 6/5038* (2013.01); *H01M 10/5004* (2013.01); *H01M 10/5055* (2013.01); *H01M 10/5057* (2013.01)
USPC ...................................... 429/120

(58) Field of Classification Search
USPC ........................................ 429/120
See application file for complete search history.

(56) References Cited

U.S. PATENT DOCUMENTS

| | | | | |
|---|---|---|---|---|
| 5,756,227 | A * | 5/1998 | Suzuki et al. | 429/62 |
| 6,512,347 | B1 * | 1/2003 | Hellmann et al. | 320/107 |
| 7,968,223 | B2 | 6/2011 | Lee et al. | |
| 7,981,538 | B2 | 7/2011 | Kim et al. | |
| 2002/0177035 | A1 * | 11/2002 | Oweis et al. | 429/120 |
| 2005/0089750 | A1 * | 4/2005 | Ng et al. | 429/120 |
| 2009/0255109 | A1 | 10/2009 | Weber et al. | |

FOREIGN PATENT DOCUMENTS

JP    2009009889 A    1/2009

OTHER PUBLICATIONS

Behr GmbH & Co., KG, "Thermal Management for Hybrid Vehicles," Technical Press Day 2009.
Chinese Patent Office, Office Action in Chinese Patent Application No. 201010593943.1, dated Mar. 26, 2013.

* cited by examiner

*Primary Examiner* — Maria J Laios
*Assistant Examiner* — Robert S Carrico
(74) *Attorney, Agent, or Firm* — Ingrassia Fisher & Lorenz, P.C.

(57) ABSTRACT

A battery module includes first, second, and third stacked battery cells, the second battery cell being arranged between the first battery cell and the third battery cell. The battery module further includes a first heat transfer layer arranged between the first battery cell and the second battery cell and a second heat transfer layer arranged between the second battery cell and the third battery cell. The battery module may further include a fluid conduit coupled to the first heat transfer layer and the second heat transfer layer.

17 Claims, 6 Drawing Sheets

BATTERY ASSEMBLIES

TECHNICAL FIELD

The inventive subject matter generally relates to batteries, and more particularly relates to battery assemblies for use in automobiles.

BACKGROUND

Electrical systems within automobiles, particularly alternative fuel vehicles, such as hybrid, electric, and fuel cell vehicles have advanced in complexity and power usage. Such alternative fuel vehicles typically use an electric motor, in combination with a battery, to drive the wheels of the vehicle.

Alternative fuel vehicles typically use high power output and large capacity batteries as the power source, e.g., a nickel-metal hydride (Ni-MH) battery. In recent years, however, the use of a lithium-ion battery has been attempted. Generally, a number of small-sized lithium-ion unit battery cells are connected in series or parallel with each other so as to construct a larger battery assembly. The battery cells may be prismatic batteries or pouch-shaped batteries that are stacked one on another to reduce dead space within the battery assembly, and thus, the overall size. The battery cells are packaged together with mechanical and electrical couplings between the battery cells to form the assembly.

Heat may be generated by the battery cells during the charge and discharge processes of the battery assembly. This heat should be effectively addressed since heat that accumulates in the battery assembly may adversely affect the battery cells. Consequently, it is necessary to provide a cooling system to maintain a desirable temperature. Conventionally, cooling systems may utilize cooling air blown over the cells. Similarly, liquid cooling may also be used. These conventional cooling systems, however, may have high manufacturing and maintenance costs, and reliability issues may arise because of the relatively high number of parts, such as seals.

Accordingly, it is desirable to provide battery assemblies with improved temperature regulation. Additionally, it is desirable to provide battery assemblies having fewer parts, reduced manufacturing and maintenance costs, and increased life cycle. Furthermore, other desirable features and characteristics of the present invention will become apparent from the subsequent description taken in conjunction with the accompanying drawings and the foregoing technical field and background.

BRIEF SUMMARY

In accordance with an exemplary embodiment, a battery module includes first, second, and third stacked battery cells, the second battery cell being arranged between the first battery cell and the third battery cell. The battery module may further include a first heat transfer layer arranged between the first battery cell and the second battery cell and a second heat transfer layer arranged between the second battery cell and the third battery cell. The battery module may further include a fluid conduit coupled to the first heat transfer layer and the second heat transfer layer.

In accordance with another exemplary embodiment, a battery module includes a plurality of stacked battery cells that include a first battery cell and a second battery cell; a first heat transfer layer arranged between the first battery cell and the second battery cell; and a serpentine fluid conduit contacting the first heat transfer layer.

DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

FIGS. 1 to 6 illustrate automobile and battery assemblies according to exemplary embodiments. Generally, the battery assemblies include one or more battery modules coupled together. Each battery module may include battery unit cells stacked together with a heat transfer layer extending between the battery unit cells. The heat transfer layer is attached to or folds around conduits on the sides of the unit cells. Coolant flowing through the conduits to remove heat generated by the battery unit cells from the heat transfer layer.

Figure 1:
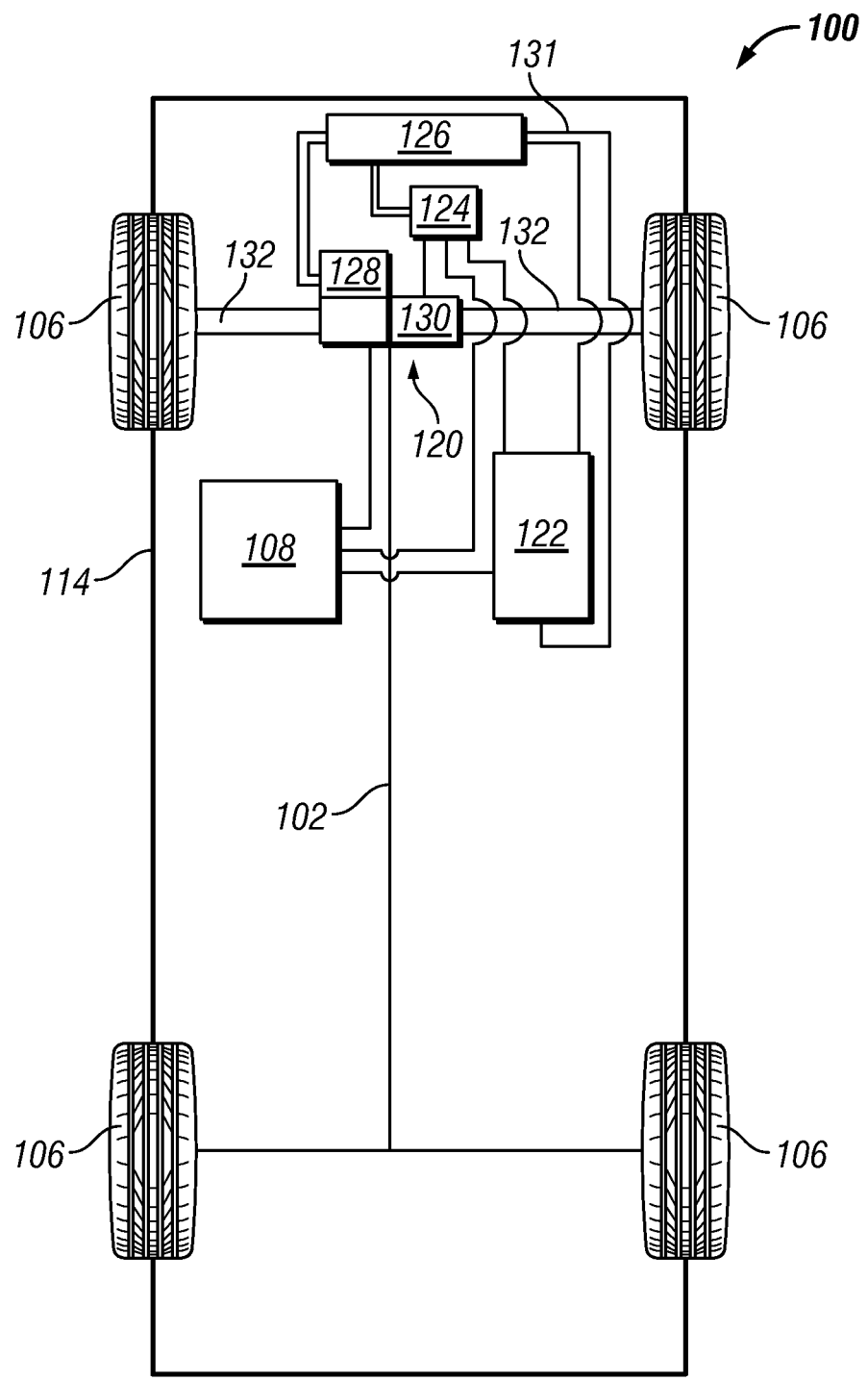
FIG. 1 is a schematic view of an automobile according to an exemplary embodiment.

FIG. 1 is a schematic view of an automobile 100 (or vehicle), according to an exemplary embodiment. In this embodiment, the automobile 100 includes a chassis 102, a body 104, four wheels 106, and an electronic control system 108. The body 104 is arranged on the chassis 102 and substantially encloses other components of the automobile 100. The body 104 and the chassis 102 may jointly form a frame. The wheels 106 are each rotationally coupled to the chassis 102 near a respective corner of the body 104.

The automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 100 may be a two, three, four, or more wheeled vehicle. The automobile 100 may also incorporate any one of, or combination of, a number of different types of engines, such as, for example, a gasoline or diesel fueled combustion engine, a "flex fuel vehicle" (FFV) engine (i.e., an engine that uses a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

According to an embodiment, the automobile 100 is a hybrid electric vehicle, and further includes an actuator assembly 120, a battery assembly 122, an inverter 124, and a heat exchanger 126. The actuator assembly 120, the battery assembly 122, and the inverter 124 are in operable communication with the electronic control system 108. The electronic control system 108 may include various sensors and automotive control modules, or electronic control units (ECUs), such as an inverter control module and a vehicle controller.

The actuator assembly 120 includes a combustion engine 128 and an electric motor/generator (or motor) 130. The combustion engine 128 and/or the electric motor 130 may be integrated such that one or both are mechanically coupled to at least some of the wheels 106 through one or more drive shafts 132. In one embodiment, the automobile 100 is a "series" hybrid electric vehicle, in which the combustion engine 128 is not directly coupled to the transmission, but coupled to a generator (not shown), which is used to power the electric motor 130. In another embodiment, the automobile 100 is a "parallel" hybrid electric vehicle, in which the combustion engine 128 is directly coupled to the transmission by, for example, having a rotor of the electric motor 130 rotationally coupled to the drive shaft 132 of the combustion engine 128. Although not shown in detail, the electric motor 130, in one embodiment, includes a stator assembly (including conductive coils or windings) and a rotor assembly (including a ferromagnetic core and/or magnets), as well as a transmission.

The battery assembly 122 may be configured to supply high voltage direct current (DC) power to the inverter 124, which may include a three-phase circuit coupled to the motor 130 to convert the DC power to alternating current (AC) power. In this regard, the inverter 124 may include a switch network having a first input coupled to the battery assembly 122 (i.e., a voltage source ($V_{dc}$)) and an output coupled to the motor 130. The switch network may include three pairs (a, b, and c) of series switches (e.g., insulated gate bipolar transistors (IGBTs) within integrated circuits formed on semiconductor substrates) with antiparallel diodes (i.e., antiparallel to each switch) corresponding to each of the phases of the motor 130. The battery assembly may include voltage adaption or transformation, such as DC/DC converters. Generally, one or more battery assemblies 122 may be distributed within the automobile 100. The battery assembly 122 is discussed in greater detail below.

The heat exchanger (e.g. a radiator and/or coolant sump) 126 is connected to the frame at an outer portion thereof and although not illustrated in detail, includes multiple cooling channels therein that contain a working fluid such as water and/or ethylene glycol (i.e., "antifreeze") and is coupled to the actuator assembly 120, the battery assembly 122, and the inverter 124 though fluid conduits 131. In general, the working fluid can be any liquid that absorbs or transfers heat to cool or heat an associated component. The term "coolant" is used herein to refer to the working fluid, although it should be noted that the coolant may heat or cool various components within the automobile 100, including the battery assembly 122.

In another embodiment, the heat exchanger 126 may form part of the air conditioning system of the automobile 100. Moreover, it should be understood that the heat exchanger 126 may be used to both cool and heat the various components to which it is coupled and may be referred to as a "thermal conditioning system." According to one exemplary embodiment, the inverter 124 receives and shares coolant with the electric motor 130 and the battery assembly 122. However, other embodiments may use separate coolants for the battery assembly 122, the inverter 124, and/or the electric motor 130. In further embodiments, the heat exchanger 126 is integrated with the battery assembly 122.

Figure 2:
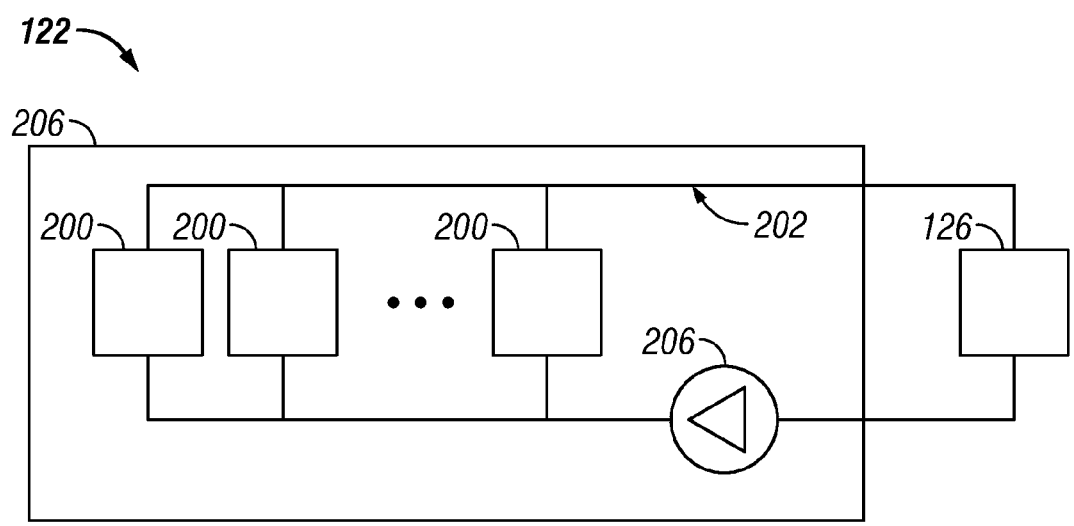
FIG. 2 is an schematic view of a battery assembly of the automobile in FIG. 1 according to an exemplary embodiment.

FIG. 2 is a more detailed, schematic view of the battery assembly 122. The battery assembly 122 made up of a number of battery modules 200. The battery modules 200 are connected in series or parallel to collectively provide voltage to the inverter 124 (FIG. 1), as described above.

As also noted above, the battery assembly 122 is cooled by a coolant that flows through a fluid circuit 202. The fluid circuit 202 includes a heat exchanger, such as heat exchanger 126, that removes heat from the coolant. In the embodiment discussed above, the heat exchanger 126 may be the radiator or coolant sump of the automobile 100 (FIG. 1). However, in other embodiments, the heat exchanger 126 may be incorporated into the battery assembly 122. For example, the heat exchanger 126 may be a cooling fan that directs cooling air into the battery assembly 122 and across the coolant. In a further embodiment, the heat exchanger may be a solid thermocouple, such as a peltier element.

Generally, coolant flows into inlets of battery assembly 122 and through the interior of the battery assembly 122 to remove heat from the battery modules 200. The coolant then flows through outlets the battery assembly 122 and through the heat exchanger 126 to discharge the heat. The coolant may then repeat the fluid circuit 202. A pump 204 may facilitate the movement of the coolant through the fluid circuit 202. Portions of the fluid circuit 202 are discussed in further detail below.

As shown in FIG. 2, the battery assembly 122 may also have an outer casing 206. The outer casing 206 may be formed by a woven plastic, molded plastic, foam, rubber, metal, or other material. In one exemplary embodiment, the outer casing 206 is molded to the interior components of the battery assembly to have a structure sufficiently rigid to retain the components in a desired position. Although not shown, the battery assembly 122 may include fastener flanges and/or mounting brackets to facilitate installation.

Figure 3:
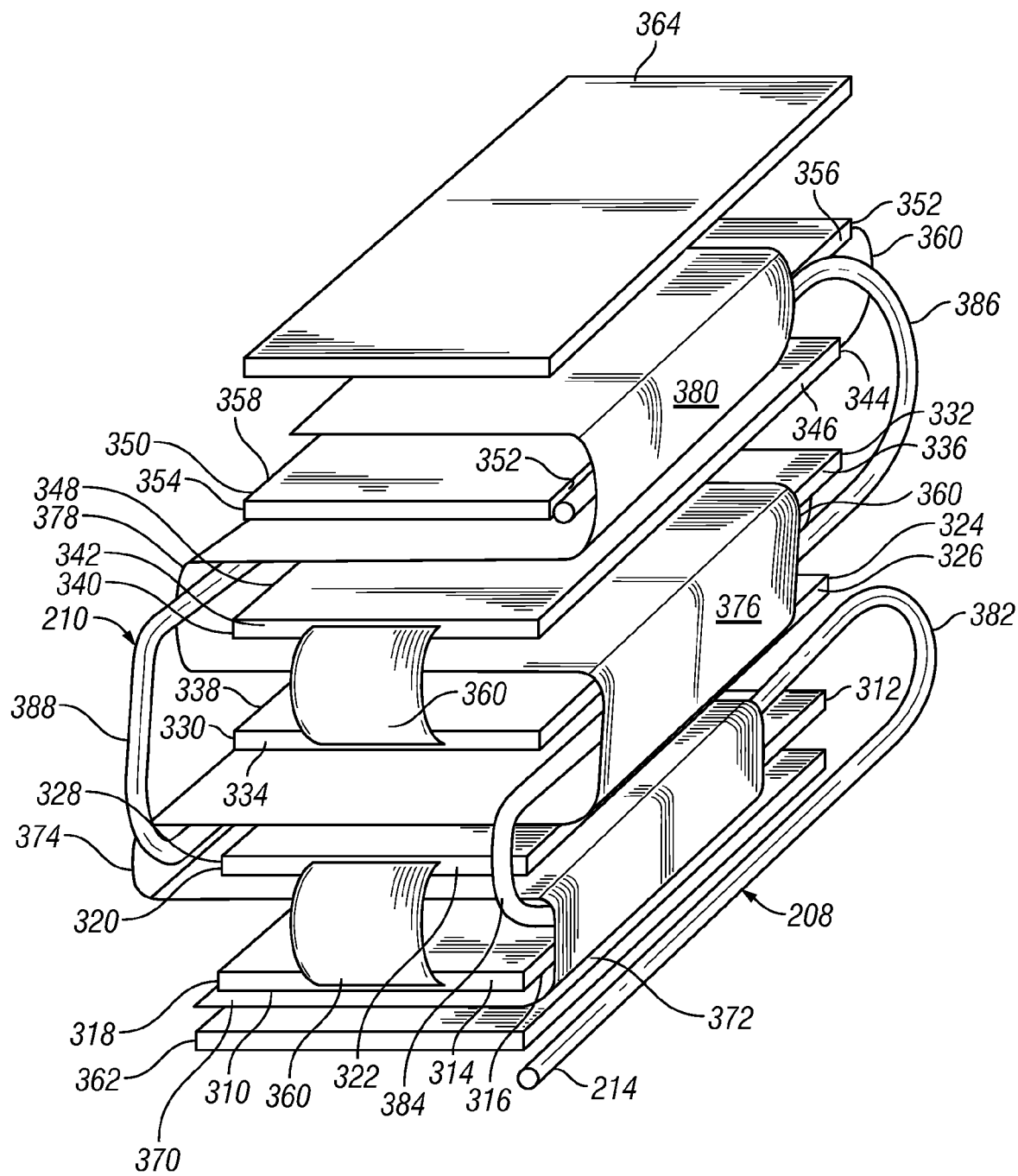
FIG. 3 is a partial, exploded isometric view of a battery module for use in the battery assembly of FIG. 2 according to an exemplary embodiment.
Figure 4:
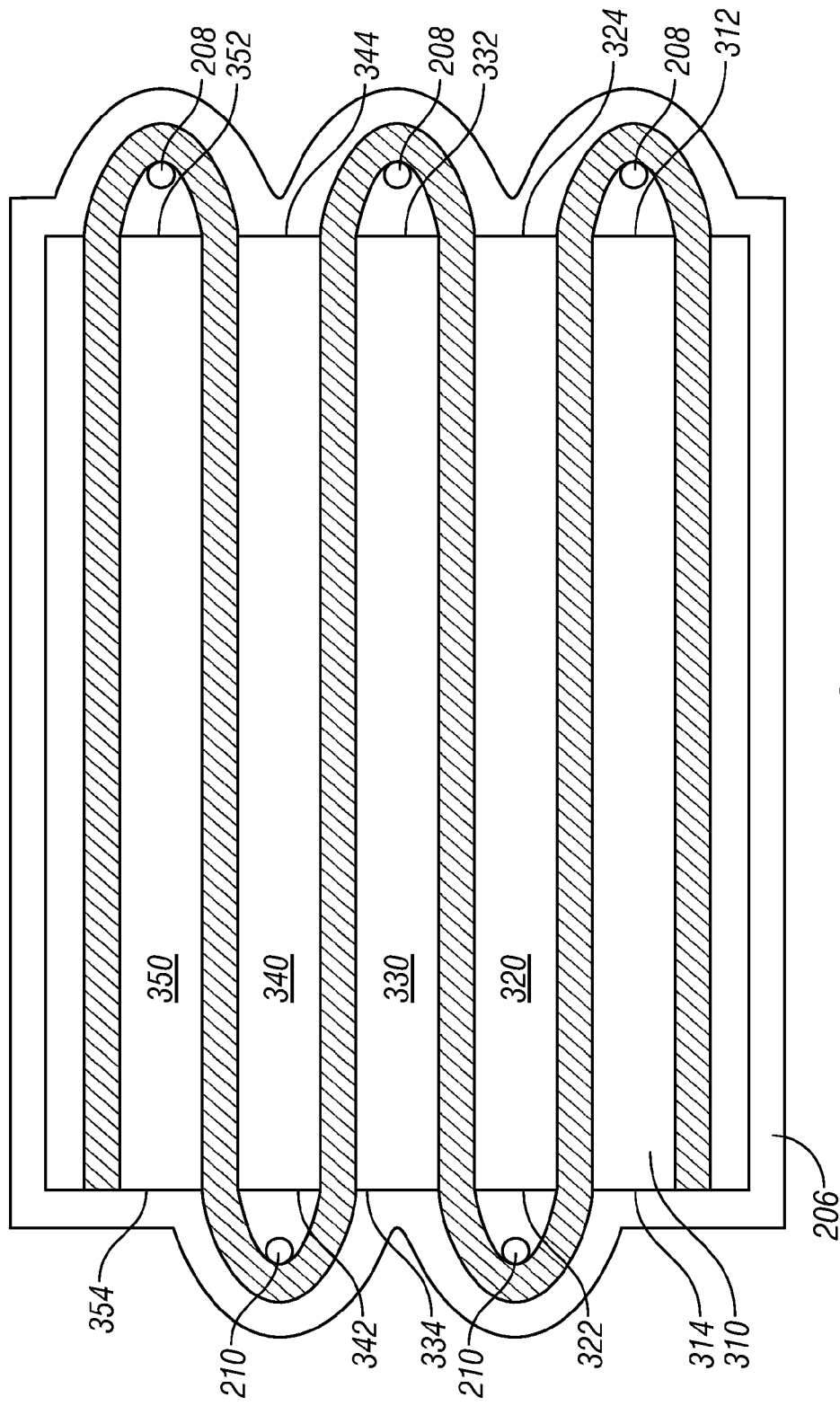
FIG. 4 is a cross-sectional end view of the battery module of FIG. 3.
Figure 5:
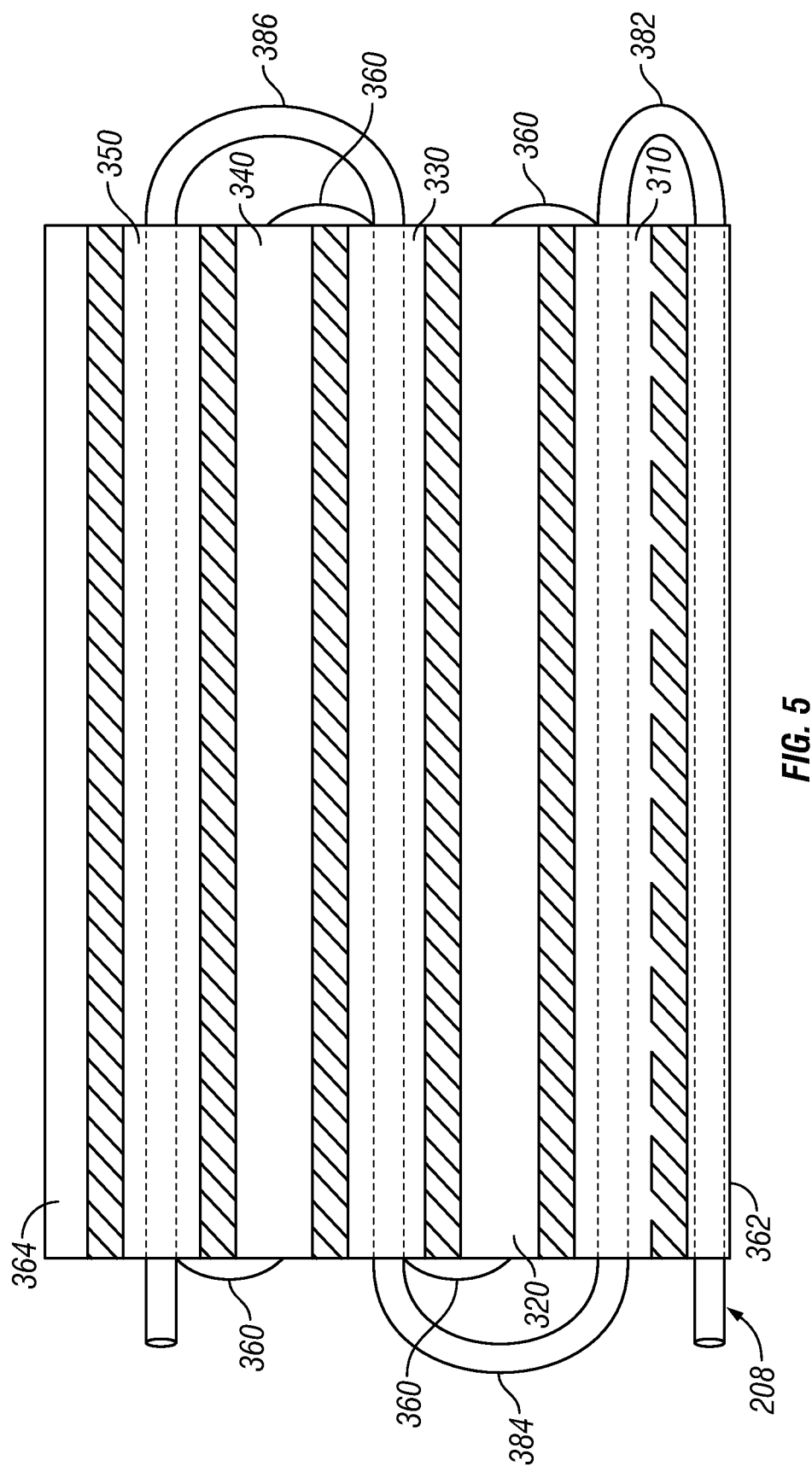
FIG. 5 is a cross-sectional side view of the battery module of FIG. 3.

FIGS. 3-5 are more detailed, interior views of a battery module 200, such as those incorporated into the battery assembly 122 discussed above. In particular, FIG. 3 is a partial, exploded isometric view, FIG. 4 is a cross-sectional end view, and FIG. 5 is a cross-sectional side view. In FIG. 3, the casing 206 is omitted for clarity. As noted above, the battery modules 200 are combined to form a single, larger battery assembly 122.

Referring to FIGS. 3-5, the battery module 200 includes a number of unit battery cells 310, 320, 330, 340, 350. In one embodiment, the unit battery cells 310, 320, 330, 340, 350 comprise prismatic lithium ion battery cells. In other embodiments, other types of battery cells may be employed. In any case, the battery cells 310, 320, 330, 340, 350 may have lengths and widths that are substantially identical, although this configuration is not necessary. Each battery cell 310, 320, 330, 340, 350 includes two end edges with one of the end edges being a positive terminal 312, 322, 332, 342, 352 and the other end edge being a negative terminal 314, 324, 334, 344, 354. The battery cells 310, 320, 330, 340, 350 are arranged in alternating directions such that the positive terminals 312, 322, 332, 342, 352 and negative terminals 314, 324, 334, 344, 354 may be electrically coupled together. For example, a terminal coupling 360 couples the negative terminal 314 of battery cell 310 with the positive terminal 322 of battery cell 320, another terminal coupling 360 couples the negative terminal 324 of battery cell 320 to the positive terminal 332 of battery cell 330, and so on. In this manner, the battery cells 310, 320, 330, 340, 350 are electrically connected in series. In other embodiments, however, unit battery cells may be connected in parallel with each other. Collectively, in series, one of the negative terminals of the unit cells, such as negative terminal 354 of outermost battery cell 350 forms a portion of the negative terminal (not shown) of the battery assembly 122 (FIG. 2), while one of the positive terminals of the unit cells, such as positive terminal 312 of the opposite outermost battery cell 310 forms a portion of the positive terminal (not shown) of the battery assembly 122 (FIG. 2). In further embodiments, the battery cells 310, 320, 330, 340, 350 may be arranged such that the positive terminals 312, 322, 332, 342, 352 and negative terminals 314, 324, 334, 344, 354 are on common edges of the respective cells.

A first end plate 362 is disposed adjacent one outermost battery cell (e.g., battery cell 310) and a second end plate 364 is disposed adjacent the opposite outermost battery cell (e.g., battery cell 350). As such, the end plates 362, 364 effectively book-end the unit battery cells 310, 320, 330, 340, 350 of the battery module 200. Although five battery cells 310, 320, 330, 340, 350 are shown disposed within the battery module 200, a greater or fewer number of battery cells may be included in other embodiments. Moreover, although not shown, the battery assembly may include additional components, such as insulating materials, mechanical couplings and/or electrical control components.

The battery cells 310, 320, 330, 340, 350 further include a first side edge 316, 326, 336, 346, 356 and a second, substantially opposite side edge 318, 328, 338, 348, 358. A heat transfer layer 370 may be threaded between the battery cells 310, 320, 330, 340, 350 in a serpentine pattern. In other words, the heat transfer layer 370 is positioned between the first end plate 362 and the first battery cell 310. The heat transfer layer 370 then forms a fold 372 around the first side edge 316 of the first battery cell 310 and extends between the first and second battery cells 310, 320. The heat transfer layer 370 then forms a fold 374 around the second side edge 328 of the second battery cell 320 and extends between the second and third battery cells 320, 330. The heat transfer layer 370 continues to extend between and around the edges 336, 348, 356 of the battery cells 330, 340, 350, forming folds 376, 378, 380. The heat transfer layer 370 may be, for example, a foil layer or sheet metal. In general, the heat transfer layer 370 may be any suitable material, such as copper or aluminum, as discussed in greater detail below.

As noted above, the battery module 200 further includes a cooling circuit 202 that may be formed by fluid conduits 208, 210 on respective sides on the battery module 200. In alternate embodiments, only a single fluid conduit is provided on a single side of the battery module 200. The fluid conduits 208, 210 generally extend through the folds 372, 374, 376, 378, 380 of the heat transfer layer 370. More specifically, the first fluid conduit 208 extends from an inlet 212 in fluid communication with the fluid circuit 202 (FIG. 2), forms a bend 384, extends though the fold 376, forms a bend 382, extends though the fold 372, forms a bend 380, and extends to an outlet 214 in fluid communication with the fluid circuit 202 (FIG. 2). Similarly, the second fluid conduit 210 extends from an inlet 216 in fluid communication with the fluid circuit 202 (FIG. 2), through the fold 378, forms a bend 386, and extends through the fold 374 to an outlet 218 in fluid communication with the fluid circuit 202 (FIG. 2).

During operation, the battery cells 310, 320, 330, 340, 350 generate heat, which is transferred to the heat transfer layer 370 sandwiched between the battery cells 310, 320, 330, 340, 350. Coolant flows through the first and second conduits 208, 210, which are in contact with the heat transfer layer 370 at the folds 372, 374, 376, 378, 380. In this manner, heat from the heat transfer layer 370 may be transferred to the coolant flowing through the fluid conduit 202, thereby cooling the battery module 200. As noted above, coolant flowing in the fluid conduits 208, 210 will flow through the fluid circuit 202 and the heat exchanger 126 (FIG. 2) to enable heat transfer to the ambient atmosphere or to be cooled via other mechanisms. Although exemplary embodiments are illustrated with portions of the fluid conduit 202 on each side of the battery cells 310, 320, 330, 340, 350, any suitable arrangement to remove a desired amount of heat may be provided. For example, in other embodiments, the fluid circuit 202 may only remove heat from every other unit battery cell 310, 320, 330, 340, 350 or from a single side of the battery module 200. Moreover, as shown, the bends 380, 382, 384, 386 are generally 180° bends, although any suitable bending arrangements and any desired number of bends may be provided.

In one exemplary embodiment, the fluid conduits 208, 210 have the same cross-sectional area and coolant flow rate, although these parameters may be modified based on cooling requirements. In general, the fluid conduits 208, 210 may include magnesium, aluminum, plastics or other materials that do not degrade when exposed to the coolant and capable of thermally conducting heat.

As such, the battery assembly 122 may exhibit improved cooling characteristics as compared to conventional battery assemblies. In particular, the heat transfer layer 370 pressed between the battery cells 310, 320, 330, 340, 350 conducts heat away from the battery cells 310, 320, 330, 340, 350, which is then transferred to the fluid conduits 208, 210 coupled to the heat transfer layer 370 to transfer heat out of the battery assembly 122. Thus, temperature regulation, as well as battery performance, may be improved. As noted above, in alternate embodiments in which overall temperature regulation is desired, the conduits 208, 210 may be used to heat the battery assembly 122 by transferring heat from a heated working fluid, to the heat transfer layer 370, and to the battery cells 310, 320, 330, 340, 350. Additionally, using the fluid conduits 208, 210 and heat transfer layer 370 may simplify the battery assembly 122 by reducing the number of parts.

Figure 6:
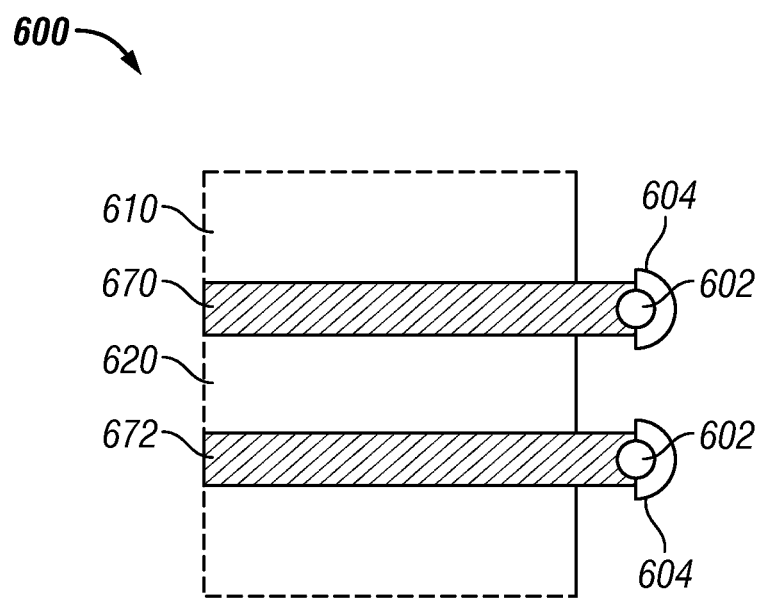
FIG. 6 is a partial cross-sectional side view of a battery module in accordance with another exemplary embodiment.

FIG. 6 is a partial cross-sectional side view of a battery module 600 in accordance with another exemplary embodiment. The view of FIG. 6 generally corresponds to the cross-sectional view of FIG. 4, and unless otherwise noted, the battery module 600 is similar to the battery module 200 discussed above.

In this embodiment, the battery module 600 includes a number of unit battery cells 610, 620. A heat transfer layer 670, 672 is sandwiched between each unit battery cell 610, 620. In this embodiment, however, the heat transfer layers 670, 672 are individual layers, not a single layer wound between the unit battery cells as discussed above. In this exemplary embodiment, a fluid circuit 602 is coupled to the heat transfer layers 670, 672 to remove heat from the unit battery cells 610, 620. The fluid circuit 602 may be coupled to the heat transfer layers 670, 672, for example, by soldering, glue, or other mechanical mechanisms, such as a clamp 604. In further embodiments, the ends of single heat transfer layers 670, 672 are wrapped around the fluid circuit 602.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A battery module, comprising:
   first, second, and third stacked battery cells, the second battery cell being arranged between the first battery cell and the third battery cell;
   a first heat transfer layer arranged between the first battery cell and the second battery cell;
   a second heat transfer layer arranged between the second battery cell and the third battery cell; and
   a fluid conduit coupled to the first heat transfer layer and the second heat transfer layer,
   wherein the first, second, and third stacked battery cells, the first heat transfer layer, the second heat transfer layer, and the fluid conduit are arranged such that heat is transferred from the first and second battery cells to the first heat transfer layer, from the second and third battery cells to the second heat transfer layer, and from the first and second heat transfer layers through the fluid conduit to fluid flowing through the fluid conduit,
   wherein each of the battery cells has first and second faces defined by first and second side edges and first and second end edges, wherein the first heat transfer layer and the second heat transfer layer are coupled together at a first fold around the first side edge of the second battery cell,
   wherein the fluid conduit includes a first portion that extends between the first fold and the first side edge of the second battery cell, extends parallel to the first side edge of the second battery cell, and extends parallel to the first fold and
   wherein the fluid conduit forms a first bend that is approximately 180°, and
   wherein the first bend of fluid conduit is concave with respect to a first direction, the first fold between the first heat transfer layer and the second heat transfer layer is concave with respect to a second direction, the first direction being orthogonal to the second direction.

2. The battery module of claim 1, further comprising
   a fourth battery cell stacked on a side of the third battery cell opposite the second battery cell; and
   a third heat transfer layer extending between the third battery cell and the fourth battery cell and forming a second fold around the second side edge of the third battery cell.

3. The battery module of claim 2, wherein the fluid conduit is a first fluid conduit and the battery module further comprises a second fluid conduit extending between the second fold and the second side edge of the third battery cell, wherein the second fluid conduit extends parallel to the second fold and parallel to the second side edge of the third battery cell.

4. The battery module of claim 3, further comprising
   a fifth battery cell stacked on a side of the fourth battery cell opposite the third battery cell; and
   a fourth heat transfer layer extending between the fourth battery cell and the fifth battery cell and forming a third fold around the first side edge of the fourth battery cell.

5. The battery module of claim 4, wherein the first fluid conduit forms a second bend and extends between the third fold and the first side edge of the fourth battery cell.

6. The battery module of claim 5, wherein the first fluid conduit and the second fluid conduit form a common fluid circuit.

7. The battery module of claim 1, wherein the fluid conduit additionally forms a second bend that is approximately 180° such that the fluid conduit has a serpentine arrangement.

8. The battery module of claim 1, wherein the fluid conduit is mechanically coupled to each of the first and second heat transfer layers.

9. The battery module of claim 1, wherein each of the first battery cell and the second battery cell has a positive and a negative terminal, the first battery cell and second battery cell being arranged such that the positive terminal of the first battery cell is adjacent the negative terminal of the second battery cell.

10. The battery module of claim 1, further comprising a casing molded around the first battery cell, the second battery cell, the first heat transfer layer, and the second heat transfer layer.

11. The battery module of claim 1, wherein the second battery cell is adjacent the first face of the first battery cell, and wherein the battery module further comprises:
    an end plate adjacent the second face of the first battery cell; and
    a third heat transfer layer extending between the end plate and the first battery cell.

12. The battery module of claim 1, wherein the fluid conduit isolates the fluid from direct contact with the first and second heat transfer layers.

13. The battery module of claim 1, wherein the first and second heat transfer layers comprise copper or aluminum, and wherein the fluid conduit comprises magnesium or plastic.

14. The battery module of claim 1, wherein the first and second heat transfer layers comprise a first material, and wherein the fluid conduit comprises a second material, different from the first material.

15. A battery module, comprising:
    a plurality of stacked battery cells that include a first battery cell and a second battery cell;
    a first heat transfer layer arranged between the first battery cell and the second battery cell; and
    a serpentine fluid conduit contacting the first heat transfer layer,
    wherein each of the plurality of the battery cells have first and second side edges, the plurality of battery cells including a third battery cell adjacent to the second battery cell, the first heat transfer element being disposed around the first side edge of the second battery cell and between the second battery cell, the first heat transfer element forming a first fold around the first side edge of the second battery cell, the fluid conduit extending through the first fold, parallel to both the first fold and the first side edge of the second battery cell,
    wherein the plurality of stacked battery cells, the first heat transfer layer, and the fluid conduit are arranged such that heat is transferred from the plurality of stacked battery cells to the first heat transfer layer, and from the first heat transfer layer through the fluid conduit to fluid flowing through the fluid conduit,
    wherein the fluid conduit forms a first bend that is approximately 180° and
    wherein the fluid conduit forms a first bend that is approximately 180°, and wherein the first bend of fluid conduit is concave with respect to a first direction, the first fold between the first heat transfer layer and the second heat transfer layer is concave with respect to a second direction, the first direction being orthogonal to the second direction.

16. The battery module of claim 15, wherein the plurality of battery cells includes a fourth battery cell arranged adjacent the third battery cell, the heat transfer element extending around the second side edge of the third battery cell and between the third battery cell and the fourth battery cell to form a second fold around the second side edge of the third battery cell, wherein the fluid conduit is a first fluid conduit and the battery module further comprises a second fluid conduit extending through the second fold and parallel to the second side edge of the third battery cell.

17. The battery module of claim 15, wherein the plurality of battery cells include a third battery cell adjacent to the second battery cell and a fourth battery cell arranged adjacent the third battery cell,
   wherein the battery module further comprises a second heat transfer layer positioned between the second battery cell and the third battery cell and a third heat transfer layer positioned between the third battery cell and the fourth battery cell, and
   wherein the fluid conduit contacts the first heat transfer layer, forms a bend, and contacts the third heat transfer layer.

\* \* \* \* \*